United States Patent
Shinomiya et al.

(10) Patent No.: US 6,433,050 B1
(45) Date of Patent: Aug. 13, 2002

(54) FLAME-RETARDANT POLYCARBONATE RESIN COMPOSITION

(75) Inventors: Tadashi Shinomiya; Ichiro Sato, both of Osaka; Masatoshi Iji; Shin Serizawa, both of Tokyo, all of (JP)

(73) Assignees: Sumitomo Dow Limited; NEC Corporation, both of Tokyo (JP)

( * ) Notice: Subject to any disclaimer, the term of this patent is extended or adjusted under 35 U.S.C. 154(b) by 0 days.

(21) Appl. No.: 09/555,285

(22) PCT Filed: Nov. 26, 1998

(86) PCT No.: PCT/JP98/05324

§ 371 (c)(1),
(2), (4) Date: Jul. 24, 2000

(87) PCT Pub. No.: WO99/28387

PCT Pub. Date: Jun. 10, 1999

(30) Foreign Application Priority Data

Nov. 28, 1997 (JP) .............................................. 9-343699

(51) Int. Cl.[7] .............................. C08J 5/10; C08K 5/24; C08L 69/00
(52) U.S. Cl. ....................... 524/265; 524/165; 524/506; 524/588; 524/268
(58) Field of Search ................................ 524/159, 165, 524/168, 263, 268, 265, 506, 588

(56) References Cited

U.S. PATENT DOCUMENTS

| 4,254,015 A | * | 3/1981 | Thomas et al. | ........ 260/45.9 R |
| 4,387,176 A | | 6/1983 | Frye | ........................... 524/268 |
| 5,041,479 A | | 8/1991 | Ogoe | ............................ 524/168 |
| 5,194,477 A | * | 3/1993 | Liu et al. | ..................... 524/382 |
| 5,449,710 A | | 9/1995 | Umeda et al. | ............... 524/165 |

FOREIGN PATENT DOCUMENTS

| EP | 0829521 | 3/1997 | ......... C08L/101/02 |
| EP | 0918073 | 5/1999 | ......... C08L/101/00 |
| JP | WO 94/07956 | 4/1994 | ........... C08L/69/00 |
| JP | 9111109 | 4/1997 | ........... C08L/69/00 |

OTHER PUBLICATIONS

EPO Patent Abstracts of Japan, Publication No., 06306265, Publication Date, Jan. 11, 1994.

* cited by examiner

Primary Examiner—James J. Seidleck
Assistant Examiner—U. K. Rajguru
(74) Attorney, Agent, or Firm—Gary C. Cohn PLLC

(57) ABSTRACT

A flame-retardant polycarbonate resin composition comprising 100 parts by weight of a polycarbonate resin (A), about 0.01 to about 8 parts by weight of a silicone compound (B) and 0.03 to 5 parts by weight of a metal salt of an aromatic sulfur compound (C) or about 0.01 to about 5 parts by weight of a metal salt of a perfluoroalkanesulfonic acid (D), or further containing about 0.05 to about 5 parts by weight of a fiber-forming fluoropolymer (E), wherein the backbone structure of said silicone compound (B) is branched and said silicone compound (B) comprises organic groups that contain aromatic groups. The flame-retardant polycarbonate resin compositions according to the present invention attain great flame retardance while retaining good impact resistance and moldability unimpaired. They also give outstanding performance from the standpoint of environmental protection because, free from a flame retardant of chlorine, bromine compound or the like, they have no danger of evolving gases that contain any retardant-derived halogen during combustion.

24 Claims, No Drawings

FLAME-RETARDANT POLYCARBONATE RESIN COMPOSITION

TECHNICAL FIELD OF THE INVENTION

This invention relates to flame-retardant polycarbonate resin compositions. More particularly, it relates to flame-retardant polycarbonate resin compositions improved in flame retardance without sacrificing the inherent outstanding properties of the polycarbonate resin, such as impact resistance and other mechanical properties, flow properties, and outward appearance of molded parts, and which contain neither a halogen type flame retardant containing chlorine or bromine compound or a phosphorus type flame retardant.

BACKGROUND OF THE PRIOR ART

Polycarbonate resins, a class of engineering plastics with excellent transparency, impact strength, heat resistance, and electrical properties, are used extensively in electrical, electronic, office automation, and many other applications.

In the electrical-electronic and OA fields there are many components, such as personal computer housings, that are required to possess high flame retardance (conforming to Underwriters' Laboratories (UL) 94V ratings) and great impact resistance. Polycarbonate resins are self-extinguishing, highly flame-retardant plastics themselves. Still, in electrical-electronic and OA applications where safety is the primary consideration, they are required to have even greater flame retardance, high enough to meet the requirements of UL94V-0 and 94V-1.

A commonly used method to improve the flame retardance of the polycarbonate resin has been to mix it with a large proportion of an oligomer or polymer of a carbonate derivative of brominated bisphenol A.

Problems Encountered

The large addition of an oligomer or polymer of a carbonate derivative of brominated bisphenol A improves the flame retardance of the polycarbonate resin. However, it reduces the impact resistance of the resin and thereby poses a problem of frequent cracking of articles molded from the resin.

On the other hand, mixing the resin with a large amount of a halogen type compound that contains bromine can evolve a gaseous product containing the particular halogen upon combustion. Thus from environmental considerations there is a demand for the use of a flame retardant free from chlorine, bromine or the like.

Meanwhile, many attempts have thus far been made to utilize silicone compounds as flame retardants. The compounds have high heat resistance, produce negligible noxious gas upon combustion, and are remarkably safe in use.

The silicone compound as a flame retardant s a polymer that results from the polymerization of at least any of the following four siloxane units (unit M, unit D, unit T, and unit Q).

Unit M (1)

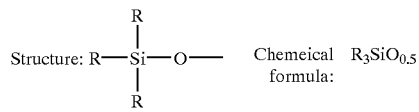

where R represents an organic group.

Unit D (2)

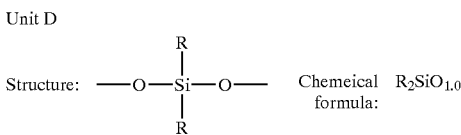

where R represents an organic group.

Unit T (3)

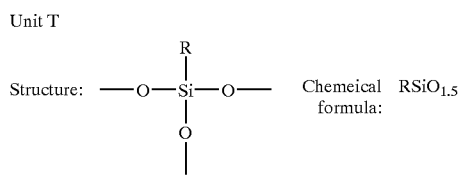

where R represents an organic group.

Unit Q (4)

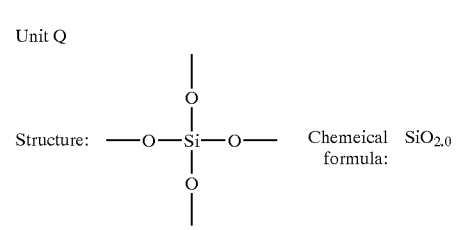

Of these units, unit T and/or unit Q, when contained in the compound, forms a branched structure.

In order to utilize silicone compounds as flame retardants, various silicone compounds having organic groups have hitherto been tried, as taught in Japanese Patent Application Public Disclosure (Kokai) No. 1-318069, Japanese Patent Application Publication (Kokoku) No. 62-60421, etc.

However, very few of those compounds can achieve an appreciable flame-retarding effect when added singly. Even one found relatively effective must be added in a large quantity if it is to meet the strict standards for electrical-electronic appliances. The large addition is not practicable because it unfavorably affects the molding, kneading, and other needed properties of the resulting plastics, and also because it adds to the cost.

Methods of combining a silicone compound with a metal salt have been reported as attempts to enhance the flame-retarding effect of a silicone compound while reducing the amount to be added. They include the combined use of polydimethyl silicone, a metal hydroxide, and a zinc compound (Japanese Patent Application Public Disclosure (Kokai) No. 2-150436) polydimethyl silicone and a Group IIa metal salt of an organic acid (Japanese Patent Application Public Disclosure (Kokai) No. 56-100853); and silicone resin, especially one represented by units M and Q, silicone oil, and a Groups IIa metal salt of an organic acid (Japanese Patent Application Publication (Kokoku) No. 3-48947). Fundamental problems common to those methods are inadequate flame-retarding effect and difficulty in substantially reducing the amount to be added.

A further combination of an organopolysiloxane having an epoxy group (γ-glycidoxypropyl group) and phenyl group and/or vinyl group and an alkali metal salt and alkaline earth metal salt of an organic sulfonic acid (Japanese Patent Application Public Disclosure (Kokai) No. 8-176425) has been reported. Since this silicone compound contains highly reactive epoxy and vinyl groups, the silicone compound can react with itself to form high molecular weight gels when mixed with the polycarbonate resin, because of high temperature, hampering thorough mixing and increasing the viscosity of the mixture. This presents problems of undesirable polycarbonate resin moldability, especially delamination, sinking, and/or unevenness of molded part surface. Moreover, the gelation does not allow the silicone compound to be thoroughly dispersed in the polycarbonate resin. This, in turn, causes problems of difficulty in attaining a noticeable flame-retarding effect and of declined strength properties such as impact strength of the molded articles.

SUMMARY OF THE INVENTION

The present inventors have intensively searched for a solution of the afore-described problems of the prior art. They have now found, as a result, that the combined use of a specific silicone compound and a metal salt of an aromatic sulfur compound or a metal salt of a perfluoroalkanesulfonic acid as a flame retardant to be mixed with a polycarbonate resin and the additional use of a fiber-forming fluoropolymer provide flame-retardant polycarbonate resin compositions possessing high flame retardance without a sacrifice of their impact resistance and molding properties. The finding has led to the perfection of the present invention.

The flame-retardant polycarbonate resin compositions according to the invention, free from a bromine type or other halogen type flame retardant, have no danger at the time of combustion of evolving gases containing the halogen that results from the halogen type flame retardant, and thereby exhibit outstanding performance from the viewpoint of environmental protection.

In brief, the invention concerns a flame-retardant polycarbonate resin composition characterized by mixing a polycarbonate resin (A) with a silicone compound (B) whose backbone structure is branched and which has aromatic groups in the organic groups it contains, and a metal salt of an aromatic sulfur compound (C) or a metal salt of a perfluoroalkanesulfonic acid (D). It also concerns a flame-retardant polycarbonate resin composition characterized by the addition of a fiber-forming fluoropolymer (E). The flame-retardant polycarbonate resin compositions according to the invention will now be described in detail.

DETAILED DESCRIPTION OF THE INVENTION

The polycarbonate resin (A) to be used in this invention is any of the polymers obtained either by the phosgene process in which one of varied dihydroxydiaryl compound is reacted with phosgene or by the ester exchange process in which a dihydroxydiaryl compound is reacted with a carbonic ester such as diphenyl carbonate. Typical of them is a polycarbonate resin produced from 2,2-bis(4-hydroxyphenyl)propane (bisphenol A).

Examples of the dihydroxydiaryl compounds, besides bisphenol A, are: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, 2,2-bis(4-hydroxyphenyl-3-methylphenyl)propane, 1,1-bis(4-hydroxy-3-tert.butylphenyl)propene, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes, such as 1,1-bis(4-hydroxyphenyl)cyclopentane and 1,1-bis(4-hydroxyphenyl)cyclohexane; dihydroxydiaryl ethers, such as 4,4'-dihydroxydiphenyl ether and 4,4'-dihydroxy-3, 3'-dimethyldiphenyl ether; dihydroxydiaryl sulfides, such as 4,4'-dihydroxydiphenyl sulfide; dihydroxyaryl sulfoxides, such as 4,4'-hydrodiphenyl sulfoxide and 4,4'-dihydroxy-3, 3'-dimethyldiphenyl sulfoxide; and dihydroxydiaryl sulfones, such as 4,4'-dihydroxydiphenyl sulfone and 4,4'-dihydroxy-3,3'-dimethyldiphenyl sulfone.

These are used singly or as a mixture of two or more. It is preferred that these compounds are not halogenated, so that they do not release halogen-containing gases into the atmosphere during combustion. Such a compound or compounds may be used in mixture with piperazine, dipiperidylhydroquinone, resorcin, 4,4'-dihydroxydiphenyl, etc.

The dihydroxyaryl compound or compounds may be used in combination with a trivalent or more polyvalent phenol compound as follows.

Tri- or more polyvalent phenols include phloroglucin, 4,6-dimethyl-2,4,6-tri(4-hydroxyphenyl)heptene, 2,4,6-dimethyl-2,4,6-tri(4-hydroxyphenyl)heptane, 1,3,5-tri(4-hydroxyphenyl)benzole, 1,1,1-tri(4-hydroxyphenyl)ethane, and 2,2-bis[4,4-(4,4'-dihydroxydiphenyl)cyclohexyl] propane.

The viscosity-average molecular weight of a polycarbonate resin (A) is usually between about 10,000 and about 100,000, preferably between about 15,000 and about 35,000. In preparing such a polycarbonate resin, it is possible to use a molecular weight modifier, catalyst, and/or other additive according to the necessity.

The silicone compound (B) to be used in the invention is one whose backbone structure is branched and which contains aromatic groups as organic groups ($R^1$, $R^2$ and $R^3$), as represented by the general formula (1).

General formula (1)

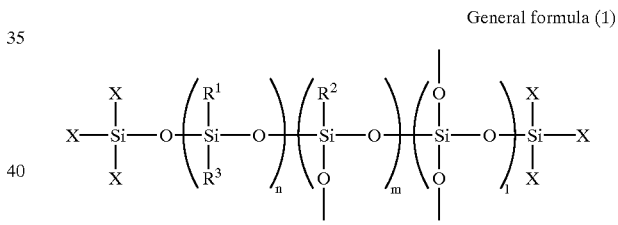

where $R^1$, $R^2$, and $R^3$ represent organic groups in the main chain, X represents an end functional group, and n, m and l represent the number of each unit.

The compound is characterized by having unit T and/or unit Q as the branching unit. It is desirable that the amount of such units contained in the compound accounts for at least about 20 mol % of the total siloxane unit content. If it is less than about 20 mol %, the resulting silicone compound (B) has inadequately low heat resistance and reduced flame-retarding effect and shows such low viscosity that it can have adverse effects upon miscibility with a polycarbonate resin (A) and upon the moldability of the resulting composition. A more desirable range is between about 30 and about 95 mol %. A unit proportion in excess of about 30 mol % further increases the heat resistance of the silicone compound (B) and substantially enhances the flame retardance of the polycarbonate resin that contains the compound. Beyond about 95 mol %, however, the units decrease the degree of freedom of the silicone's principal chain, frequently hampering the condensation of the aromatic ring during combustion and rendering it difficult to exhibit remarkable flame retardance.

It is also advisable that the silicone compound (B) should contain organic groups of which aromatic groups account for at least about 20 mol %. Below this limit condensation among the aromatic rings tends to occur scarcely during combustion, thus reducing the flame-retarding effect. A preferred range is between about 40 and about 95 mol %. Over about 40 mol % the aromatic groups condense more effectively during combustion while, at the same time, the dispersibility of the silicone compound (B) in the polycarbonate resin (A) is substantially enhanced, and a very high flame-retarding effect is achieved. Beyond about 95 mol %, however, steric hindrance among the aromatic groups tends to obstruct their condensation, sometimes making it difficult to attain a noticeable flame-retarding effect.

The aromatic groups to be contained are phenyl, biphenyl, naphthalene, or their derivatives. The phenyl group is preferred from the view point of industrial hygiene of the silicone compound (B). Of the organic groups in the silicone compound (B), the organic group other than the aromatic group is preferably methyl group. It is also desirable that the end group is one or a mixture of two to four different groups selected from the class consisting of methyl group, phenyl group, hydroxyl group, and alkoxy groups (especially methoxy group). These end groups, with low reactivity, rarely cause gelation (crosslinking) of the silicone compound (B) during the mixing of the compound with the polycarbonate resin (A). Consequently, the silicone compound (B) can be uniformly dispersed in the polycarbonate resin (A), whereby a better flame-retarding effect is achieved and enhanced moldability is attained. Particularly desirable is methyl group, which, with exceptionally low reactivity, brings extremely desirable dispersibility and a further improvement in flame retardance.

The (weight) average molecular weight of the silicone compound (B) desirably ranges from about 5,000 to about 500,000. If it is less than about 5,000, the heat resistance of the silicone compound itself is insufficient, with a reduced flame-retarding effect. In addition, the melt viscosity is so low that the silicone compound can bleed to the surface of a molded part of the polycarbonate resin (A) at the time of molding, thus often affecting the moldability unfavorably. Conversely if it is more than about 500,000, the melt viscosity increases excessively to hinder the uniform dispersion of the compound in the polycarbonate resin (A). This sometimes decreases in the flame-retarding effect or moldability. A more desirable range is from about 10,000 to about 270,000. In this range the melt viscosity of the silicone compound (B) is optimum, enabling the compound to be most uniformly dispersed in the polycarbonate resin (A) with no excessive bleeding to the surface, thus realizing even higher flame retardance and moldability.

The amount of silicone compound (B) to be used desirably ranges from about 0.01 to about 8 parts by weight per 100 parts by weight of the polycarbonate resin (A). When the amount is less than about 0.01 part by weight, the flame-retarding effect is sometimes insufficient. When it is more than about 8 parts by weight, delamination can mar the appearance of the molded articles. A more desirable range is from about 0.1 to about 5 parts by weight, and even more desirable range is from about 0.5 to about 2 parts by weight. In the last-mentioned range, a better balance is attained between the flame retardance and moldability and between them and impact strength.

The metal salt of an aromatic sulfur compound (C) to be used in the present invention is either a metal salt of an aromatic sulfonamide of the general formula (2) or (3) below or a metal salt of an aromatic sulfonic acid of the general formula (4) below.

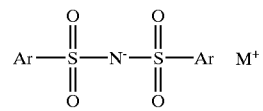

General formula (2)

(In the general formula (2) Ar is a phenyl or substituted phenyl group and M is a metal cation.)

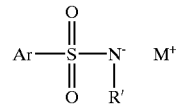

General formula (3)

(In the general formula (3) Ar is phenyl or substituted phenyl group, R' is an organic group that may contain a sulfonyl or carbonyl group, and M is a metal cation, with the proviso that Ar may be a phenylene to link with R'.)

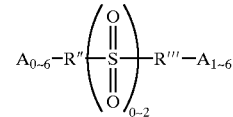

General formula (4)

(In the general formula (4) R" and R'" are the same or different and represent aliphatic groups containing 1 to 6 carbon atoms, phenyl, biphenylyl or substituted phenyl or biphenylyl groups, and A represents an $SO_3M$ group, in which M is a metal cation.)

Desirable examples of metal salts of aromatic sulfonamides are metal salts of saccharin, metal salts of N-(p-tolylsulfonyl)-p-toluenesulfoimide, metal salts of N-(N'-benzylaminocarbonyl)sulfanylimide, and metal salts of N-(phenylcarboxyl)-sulfanylimide. Metal salts of aromatic sulfonic acids are, for example, metal salts of diphenylsulfone-3-sulfonic acid, diphenylsulfone-3,3'-disulfonic acid, and diphenylsulfone-3,4'-disulfonic acid. They may be used singly or in combination.

Suitable metals are Group I metals (alkali metals) such as sodium and potassium, Group II metals (alkaline earth metals), copper, aluminum, etc., especially alkali metals.

Preferred above these are potassium salts, such as potassium salt of N-(p-tolylsulfonyl)-p-toluenesulfoimide, potassium salt of N-(N'-benzylaminocarbonyl)sulfanylimide, and potassium salt of diphenylsulfone-3-sulfonic acid. More preferred are potassium salt of N-(p-tolylsulfonyl)-p-toluenesulfoimide and potassium salt of N-(N'-benzylaminocarbonyl)sulfanylimide.

The amount of a metal salt of an aromatic sulfur compound (C) to be used desirably ranges from about 0.03 to about 5 parts by weight per 100 parts by weight of a polycarbonate resin (A). When the amount is less than about 0.03 part by weight, it is sometimes hard to attain a noticeable flame-retarding effect, with adverse effects upon the moldability and impact strength. A preferred range is between about 0.05 and about 2 parts by weight, and a more preferred range is between about 0.06 and about 0.4 part by weight. In this range, above all, flame retardance, moldability, and impact strength are better balanced.

The metal salt of a perfluoroalkanesulfonic acid (D) to be used in this invention is a metal salt of formula (5) below:

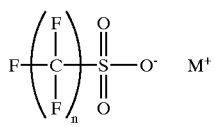

in which M is a metal cation and n is an integer of 1 to 8.

The metal salt of a perfluoroalkanesulfonic acid (D) includes a metal salt of a perfluoromethanesulfonic acid, a metal salt of a perfluoroethanesulfonic acid, a metal salt of a perfluoropropanesulfonic acid, a metal salt of a perfluorobutanesulfonic acid, a metal salt of a perfluoropentanesulfonic acid, a metal salt of a perfluorohexanesulfonic acid, a metal salt of a perfluoroheptanesulfonic acid, a metal salt of a perfluorooctanesulfonic acid and the like or a mixture thereof. The metal salt of a perfluoroalkanesulfonic acid may be used in combination with the aromatic sulfur compound (C) described above.

The metal used in the metal salt of a perfluoroalkanesulfonic acid (D) includes Group I metals (alkali metals) such as sodium and potassium, Group II metals (alkaline earth metals), copper and aluminum. The alkali metal is preferred.

Preferred metal salt of a perfluoroalkanesulfonic acid (D) is a potassium salt of a perfluorobutanesulfonic acid.

The amount of a metal salt of a perfluoroalkanesulfonic acid (D) is about 0.01 to about 5 parts by weight based on 100 parts by weight of polycarbonate resin (A). If the amount is smaller than about 0.01 part by weight, its flame retardance is sometimes insufficient, whereas an amount beyond about 5 parts by weight may result in a poor thermal stability on injection molding, which may badly influence the moldability or the impact strength. The amount is preferably about 0.02 to about 2 parts by weight, and more preferably about 0.03 to about 0.2 parts by weight. The latter range particularly brings a good balance among flame retardance, moldability and impact strength.

The fiber-forming fluoropolymer (E) to be used in this invention desirably is one which forms a fiber (fibril type structure) structure in a polycarbonate resin (A). Useful are polytetrafluoroethylenes, tetrafluoroethylene copolymers (e.g., tetrafluoroethylene/hexafluoropropylene copolymer), partially fluorinated polymers as taught by U.S. Pat. No. 4,379,910, and polycarbonates produced from fluorinated diphenol. When such a polymer is used together with a combination of a silicone compound (B) and a metal salt of an aromatic sulfur compound (C), or a combination of a silicone compound (B) and a metal salt of a perfluoroalkanesulfonic acid (D) according to the invention, it proves effective not only in preventing dripping but in specifically shortening combustion time.

The amount of a fiber-forming fluoropolymer (E) to be used is in the range from about 0.05 to about 5 parts by weight per 100 parts by weight of a polyearbonate resin (A). If the amount is smaller than about 0.05 part by weight, its dripping-preventive effect during combustion is sometimes insufficient, whereas an amount beyond about 5 parts by weight can make the resulting composition difficult to granulate, thereby hampering stable production. A preferred range is between about 0.05 and about 1 part by weight and a more preferred range is between about 0.1 and about 0.5 part by weight. In this range the balance between flame retardance, moldability, and impact strength is further improved.

The polycarbonate resin (A) may be mixed, unless the addition does not impair the advantageous effects of the invention, with other additives, such as any of various heat stabilizers, antioxidants, colorants, fluorescent brighteners, fillers, mold releasing agents, softening agents, antistatic agents, impact property improvers, and other polymers.

Heat stabilizers are, for example, metal hydrogensulfates such as sodium hydrogensulfate, potassium hydrogensulfate, and lithium hydrogensulfate, and metal sulfates such as aluminum sulfate. Such a stabilizer is usually used in an amount of from about 0 to about 0.5 part by weight per 100 parts by weight of a polycarbonate resin (A).

Fillers include glass fiber, glass beads, glass flakes, carbon fiber, talc powder, clay powder, mica, potassium titanate whiskers, wollastonite powder, and silica powder.

Among impact property improvers are acrylic elastomers, polyester elastomers, core-shell type methyl methacrylate-butadiene-styrene copolymer, methyl methacrylate-acrylonitrile-styrene copolymer, ethylene-propylene rubber, and ethylene-propylene-diene rubber.

Examples of other polymers are polyesters, such as polyethylene terephthalate and polybutylene terephthalate; polystyrenes; styrenic polymers, such as high-impact polystyrenes, acrylonitrile-styrene copolymer and its acrylic rubber modification products, acrylonitrile-butadiene-styrene copolymer, and acrylonitrile-ethylene-propylene-diene rubber (EPDM)-styrene copolymer; polypropylenes; and polymers usually used as alloyed with polycarbonate resins.

There is no special limitation to the method of mixing the various components in the flame-retardant polycarbonate resin composition of the invention. For example, either mixing by means of a conventional mixer such as a tumbler, a ribbon blender or melt mixing by an extruder may be used.

As for the method of molding the flame-retardant polycarbonate resin composition of the invention, injection molding, injection-compression molding, or other conventional molding technique can be employed without special limitation.

EXAMPLES

The following examples illustrate the invention without however limiting it. All parts are by weight.

Examples 1 to 61 and Comparative Examples 1 to 30

100 parts portions of a polycarbonate resin derived from bisphenol A are mixed each with 0.03 part of potassium hydrogensulfate and varied proportions of other components listed in Tables 2 to 13. The resulting mixtures are melt mixed using a 37 mm-diameter twin-screw extruder (Model "KTX-37" manufactured by Kobe Steel, Ltd.) at a cylinder temperature of 280 degree C. Various pelletized products are thus obtained.

The particulars of the materials used are as follows:

1. Polycarbonate Resin (A)

Made by Sumitomo Dow Limited under the tradename of "Calibre 200-20" (viscosity-average molecular weight=19,000).

2. Silicone Compound (B)

The silicone compound (B) is produced by a conventional process. In proportion to the molecular weight of a silicone compound component and to the proportions of the units M, D, T, and Q that constitute a silicone compound, a suitable amount of diorganodichlorosilane, monoorganotrichlorosilane, tetrachlorosilane, or a partially hydrolyzed condensate of such a silane is dissolved in an organic solvent. Hydrolysis is carried out by the addition of water, and a partially condensed silicone compound is formed. It is further reacted with the addition of triorganochlorosilane to conclude the polymerization. The solvent is thereafter separated off by distillation or other technique. The structural properties of 19 different silicone compounds thus synthesized by the above method are shown in Table 1.

TABLE 1

| Silicone | Backbone structure D/T/Q ratio (mol ratio) | Phenyl group ratio to total organic group* (mol %) | Structure and ratio of end group (mol ratio) | Molecular weight (weight average)** |
|---|---|---|---|---|
| a | 0.7/9.3/0 | 60 | methyl only | 12,000 |
| b | 2/8/0 | 60 | methyl only | 7,000 |
| c | 2/8/0 | 60 | methyl only | 12,000 |
| d | 2/8/0 | 60 | methyl only | 70,000 |
| e | 2/8/0 | 60 | methyl only | 250,000 |
| f | 2/8/0 | 60 | methyl only | 300,000 |
| g | 2/8/0 | 60 | hydroxyl only | 250,000 |
| h | 5/5/0 | 40 | methyl | 80,000 |
| i | 6.5/3.5/0 | 50 | methyl only | 50,000 |
| j | 6.5/1.5/2 | 50 | methyl only | 50,000 |
| k | 6.5/3.5/0 | 50 | methyl/methoxy = 1/1 | 50,000 |
| l | 7.5/2.5/0 | 50 | methyl only | 50,000 |
| m | 9/1/0 | 50 | methyl only | 50,000 |
| n | 10/0/0 | 50 | methyl only | 50,000 |
| o | 2/8/0 | 90 | phenyl only | 70,000 |
| p | 2/8/0 | 45 | methyl only | 70,000 |
| q | 2/8/0 | 25 | methyl only | 70,000 |
| r | 2/8/0 | 10 | methyl only | 70,000 |
| s | 2/8/0 | 0 | methyl only | 70,000 |

*The phenyl groups in the silicone compound are provided through a T unit. If all of the phenyl groups cannot be added through the T units, then the additional phenyl groups are provided through D units. The D units will contain only one phenyl group if all of the additional phenyl groups can be provided in that way. If even more phenyl groups are needed, then D units containing two phenyl groups are used. Except for the phenyl groups and the end groups as indicated in Table I, all organic groups are methyl.
**For the weight-average molecular weight, significant figures are two in number.

3. Metal Salt of an Aromatic Sulfur Compound (C)
Potassium salt of N-(p-tolysulfonyl)-p-toluenesulfoimide (hereinafter called "C-1").
Potassium salt of N-(N'-benzylaminocarbonyl) sulfanylimide (hereinafter called "C-2").
Potassium diphenylsulfone-3-sulfonate (hereinafter called "C-3").
4. Metal Salt of a Perfluoroalkanesulfonic Acid (D)
Potassium salt of a perfluorobutanesulfonic acid (hereinafter called "Metal salt D")
5. Fiber-forming Fluoropolymer (E)
Polytetrafluoroethylene ("Polyfuron FA-500" made by Daikin Kogyo Co., Ltd.) (hereinafter called "PTFE").
6. Carbonate Oligomer of Tetrabromobisphenol A
"BC-52" by Great Lakes Chemicals (hereinafter called "Br oligomer").

The various pellets so obtained are dried at 125 degree C. for 4 hours and then molded by an injection molding machine (Model "J-100-E-C5" manufactured by Nippon Seiko K. K.) at 280 degree C. and at an injection pressure of 1600 kg/cm$^2$, and test specimens (125×13×1.6 mm and 124×13×3.2 mm) for the evaluation of flame retardance are formed.

The specimens are allowed to stand in a thermostatically controlled chamber at a temperature of 23 degree C. and a humidity of 50% for 48 hours. They are then tested for flame retardance and evaluated in conformity with Underwriters' Laboratories testing standards UL94 (for the evaluation of combustibility of plastic materials for appliance components). UL94V designates evaluation of the flame retardance from the afterflame and dripping after exposure of a test specimen of a given size held upright to a burner flame in contact for 10 seconds. The ratings are as follows:

|  | V-0 | V-1 | V-2 |
|---|---|---|---|
| Afterflame of each specimen | ≦10 sec. | ≦30 sec. | ≦30 sec. |
| Total afterflame of five specimen | ≦50 sec. | ≦250 sec. | ≦250 sec. |
| Ignition of cotton by dropping | no | no | yes |

The term "afterflame" as used herein means the period of time in which a test specimen continues burning after the source of ignition has been moved away. "The ignition of cotton by dropping" means whether or not a piece of cotton placed about 300 mm below the lower end of a specimen catches fire from a drip of melt from the specimen. The results are given in Tables 2 to 13.

The various pellets obtained are likewise injection molded to form test specimens (3.2×12.7×63.5 mm) for the evaluation of their impact strength. The notched impact strength values of the specimens are measured in conformity with ASTM D-256. As for the outward appearance of the molded pieces, the specimens are visually inspected, prior to the impact strength measurement, to see if they had signs of delamination or sinking on the surface. The results are shown in Tables 2 to 13.

In Table 2 to 13, the numerical values of Br type oligomer, silicone, metal salt, and PTFE represent the amounts (parts by weight) added per 100 parts of a polycarbonate resin. In the evaluation of flame retardance, the values in parentheses( ) indicate the total (in seconds) of afterflame (duration of combustion after ignition) of five specimens. The values in [ ] are the number of specimens (among five specimens) that caused fire to marking cotton by dripping. Moldability is evaluated by inspecting the molded specimens for delamination, surface unevenness, and sinking. (○ designates no such defect found, Δ designates defects in 1 to 2 specimens, and × designates defects in 3 or more specimens out of five specimens.)

TABLE 2

|  | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Silicone a | 2 | — | — | — | — | — | — | — | — | — | — |
| Silicone b | — | 2 | — | — | — | — | — | — | — | — | — |
| Silicone c | — | — | 2 | — | — | — | — | — | — | — | — |
| Silicone d | — | — | — | 4 | 4 | 4 | 4 | 4 | 1 | 1 | 1 |
| Metal salt C-1 | 0.1 | 0.1 | 0.1 | 0.04 | 0.1 | 0.4 | 4 | 0.1 | 0.06 | 0.2 | 2 |
| PTFE | 0.3 | 0.3 | 0.3 | — | — | — | — | 0.2 | 0.2 | 0.2 | 0.2 |

TABLE 2-continued

|  | Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Flame retardance UL94 | | | | | | | | | | | |
| 3.2 mm thick | V-0 (26) | V-0 (25) | V-0 (20) | V-0 (44) | V-0 (29) | V-0 (31) | V-1 (65) | V-0 (19) | V-0 (34) | V-0 (14) | V-0 (37) |
| 1.6 mm thick | V-0 (33) | V-0 (34) | V-0 (25) | V-1 (59) | V-0 (37) | V-0 (40) | V-1 (83) | V-0 (24) | V-0 (48) | V-0 (17) | V-1 (53) |
| Moldability | ○ | Δ | ○ | ○ | ○ | ○ | Δ | ○ | ○ | ○ | ○ |
| Notched inpact strength (Kgcm/cm) | 62 | 61 | 63 | 63 | 63 | 63 | 59 | 63 | 63 | 64 | 61 |

TABLE 3

|  | Example | | | | | | | | | |
| --- | --- | --- | --- | --- | --- | --- | --- | --- | --- | --- |
|  | 12 | 13 | 14 | 15 | 16 | 17 | 18 | 19 | 20 | 21 |
| Silicone e | 0.5 | 4 | 7 | 0.02 | 0.5 | 4 | 7 | — | — | — |
| Silicone f | — | — | — | — | — | — | — | 4 | — | — |
| Silicone g | — | — | — | — | — | — | — | — | 4 | 4 |
| Metal salt C-1 | 0.1 | 0.1 | 0.1 | 0.1 | 0.1 | 0.1 | 0.1 | 0.1 | 0.1 | 0.1 |
| PTFE | — | — | — | 0.3 | 0.3 | 0.3 | 0.3 | 0.3 | — | 0.3 |
| Flame retardance UL94 | | | | | | | | | | |
| 3.2 mm thick | V-0 (31) | V-0 (25) | V-0 (40) | V-1 (70) | V-0 (16) | V-0 (13) | V-0 (28) | V-0 (25) | V-0 (33) | V-0 (19) |
| 1.6 mm thick | V-0 (39) | V-0 (35) | V-0 (49) | V-1 (95) | V-0 (21) | V-0 (17) | V-0 (37) | V-0 (34) | V-0 (43) | V-0 (26) |
| Moldability | ○ | ○ | ○ | ○ | ○ | ○ | ○ | Δ | ○ | ○ |
| Notched inpact strength (Kgcm/cm) | 63 | 64 | 63 | 54 | 63 | 64 | 62 | 62 | 63 | 63 |

TABLE 4

|  | Example | | | | | | |
| --- | --- | --- | --- | --- | --- | --- | --- |
|  | 22 | 23 | 24 | 25 | 26 | 27 | 28 |
| Silicone h | 2 | 2 | 2 | 2 | 2 | 2 | 2 |
| Metal salt C-1 | 0.1 | 0.1 | 0.1 | 0.1 | 0.1 | 0.1 | 0.1 |
| PTFE | — | 0.06 | 0.1 | 0.3 | 0.5 | 1 | 4 |
| Flame retardance UL94 | | | | | | | |
| 3.2 mm thick | V-0 (38) | V-0 (29) | V-0 (20) | V-0 (18) | V-0 (19) | V-0 (31) | V-0 (35) |
| 1.6 mm thick | V-1 (51) | V-0 (40) | V-0 (28) | V-0 (26) | V-0 (27) | V-0 (35) | V-0 (48) |
| Moldability | ○ | ○ | ○ | ○ | ○ | ○ | ○ |
| Notched inpact strength (Kgcm/cm) | 62 | 62 | 62 | 62 | 62 | 61 | 60 |

TABLE 5

|  | Example | | | | | | | |
| --- | --- | --- | --- | --- | --- | --- | --- | --- |
|  | 29 | 30 | 31 | 32 | 33 | 34 | 35 | 36 |
| Silicone i | 2 | 2 | — | — | — | — | — | — |
| Silicone j | — | — | 2 | — | — | — | — | — |
| Silicone k | — | — | — | 2 | — | — | — | — |
| Silicone l | — | — | — | — | 2 | 2 | — | — |
| Silicone m | — | — | — | — | — | — | 2 | 2 |
| Metal salt C-1 | 0.1 | 0.1 | 0.1 | 0.1 | 0.1 | 0.1 | 0.1 | 0.1 |
| PTFE | — | 0.3 | 0.3 | 0.3 | — | 0.3 | — | 0.3 |

TABLE 5-continued

| | Example | | | | | | | |
|---|---|---|---|---|---|---|---|---|
| | 29 | 30 | 31 | 32 | 33 | 34 | 35 | 36 |
| Flame retardance UL94 | | | | | | | | |
| 3.2 mm thick | V-0 (33) | V-0 (21) | V-0 (18) | V-0 (29) | V-0 (46) | V-0 (34) | V-1 (64) | V-1 (55) |
| 1.6 mm thick | V-0 (48) | V-0 (28) | V-0 (27) | V-0 (39) | V-1 (75) | V-0 (50) | V-2 [1] | V-1 (81) |
| Moldability | ○ | ○ | ○ | ○ | ○ | ○ | Δ | Δ |
| Notched inpact strength (Kgcm/cm) | 61 | 61 | 62 | 61 | 60 | 60 | 58 | 58 |

TABLE 6

| | Example | | | | | | | |
|---|---|---|---|---|---|---|---|---|
| | 37 | 38 | 39 | 40 | 41 | 42 | 43 | 44 |
| Silicone o | 2 | 2 | — | — | — | — | — | — |
| Silicone p | — | — | 2 | 2 | — | — | — | — |
| Silicone q | — | — | — | — | 2 | 2 | — | — |
| Silicone r | — | — | — | — | — | — | 2 | 2 |
| Metal salt C-1 | 0.1 | 0.1 | 0.1 | 0.1 | 0.1 | 0.1 | 0.1 | 0.1 |
| PTFE | — | 0.3 | — | 0.3 | — | 0.3 | — | 0.3 |
| Flame retardance UL94 | | | | | | | | |
| 3.2 mm thick | V-0 (32) | V-0 (21) | V-0 (30) | V-0 (16) | V-0 (44) | V-0 (31) | V-1 (62) | V-1 (53) |
| 1.6 mm thick | V-0 (44) | V-0 (33) | V-0 (43) | V-0 (24) | V-1 (68) | V-0 (46) | V-2 [1] | V-1 (78) |
| Moldability | ○ | ○ | ○ | ○ | ○ | ○ | Δ | Δ |
| Notched inpact strength (Kgcm/cm) | 65 | 65 | 63 | 63 | 61 | 61 | 56 | 55 |

TABLE 7

| | Example | | | | | | | | |
|---|---|---|---|---|---|---|---|---|---|
| | 45 | 46 | 47 | 48 | 49 | 50 | 51 | 52 | 53 |
| Silicone d | 1 | 1 | 1 | — | — | — | — | — | — |
| Silicone e | — | — | — | 4 | 4 | 4 | — | — | — |
| Silicone h | — | — | — | — | — | — | 2 | 2 | 2 |
| Metal salt C-1 | 0.1 | — | — | 0.2 | — | — | 0.1 | — | — |
| Metal salt C-2 | — | 0.1 | — | — | 0.2 | — | — | 0.1 | — |
| Metal salt C-3 | — | — | 0.1 | — | — | 0.2 | — | — | 0.1 |
| PTFE | 0.3 | 0.3 | 0.3 | — | — | — | 0.2 | 0.2 | 0.2 |
| Flame retardance UL94 | | | | | | | | | |
| 3.2 mm thick | V-0 (9) | V-0 (10) | V-0 (19) | V-0 (25) | V-0 (27) | V-0 (36) | V-0 (19) | V-0 (21) | V-0 (29) |
| 1.6 mm thick | V-0 (11) | V-0 (11) | V-0 (20) | V-0 (36) | V-0 (38) | V-0 (49) | V-0 (28) | V-0 (29) | V-0 (40) |
| Moldability | ○ | ○ | ○ | ○ | ○ | ○ | ○ | ○ | ○ |
| Notched inpact strength (Kgcm/cm) | 64 | 64 | 64 | 63 | 64 | 63 | 62 | 62 | 62 |

TABLE 8

| | Example | | | | | | | |
|---|---|---|---|---|---|---|---|---|
| | 54 | 55 | 56 | 57 | 58 | 59 | 60 | 61 |
| Silicone d | 4 | 4 | 4 | 4 | 4 | 1 | 1 | 1 |
| Metal salt D | 0.02 | 0.07 | 0.2 | 4 | 0.07 | 0.03 | 0.1 | 2 |
| PTFE | — | — | — | — | 0.3 | 0.3 | 0.3 | 0.3 |

TABLE 8-continued

| | Example | | | | | | | |
|---|---|---|---|---|---|---|---|---|
| | 54 | 55 | 56 | 57 | 58 | 59 | 60 | 61 |
| Flame retardance UL94 | | | | | | | | |
| 3.2 mm thick | V-0 (49) | V-0 (36) | V-0 (42) | V-1 (76) | V-0 (24) | V-0 (39) | V-0 (16) | V-0 (45) |
| 1.6 mm thick | V-1 (90) | V-0 (40) | V-0 (55) | V-1 (109) | V-0 (31) | V-0 (48) | V-0 (18) | V-1 (61) |
| Moldability | ○ | ○ | ○ | Δ | ○ | ○ | ○ | ○ |
| Notched inpact strength (Kgcm/cm) | 62 | 63 | 63 | 57 | 63 | 62 | 63 | 60 |

TABLE 9

| | Comparative Example | | | | | | | |
|---|---|---|---|---|---|---|---|---|
| | 1 | 2 | 3 | 4 | 5 | 6 | 7 | 8 |
| Br type of oligomer | — | — | — | — | 5 | — | — | — |
| Silicone d | — | — | — | — | — | 1 | 1 | 4 |
| Metal salt C-1 | — | 0.1 | — | 0.1 | — | 0.02 | 6 | 6 |
| PTFE | — | — | 0.3 | 0.3 | 0.3 | 0.2 | 0.2 | — |
| Flame retardance UL94 | | | | | | | | |
| 3.2 mm thick | V-2 [5] | V-2 [5] | V-1 (151) | V-1 (147) | V-0 (38) | V-1 (81) | V-1 (94) | V-1 (118) |
| 1.6 mm thick | V-2 [5] | V-2 [5] | V-2 [2] | V-2 [2] | V-0 (45) | V-1 (101) | V-1 (111) | V-1 (127) |
| Moldability | ○ | ○ | ○ | ○ | ○ | ○ | Δ | Δ |
| Notched inpact strength (Kgcm/cm) | 68 | 60 | 41 | 40 | 28 | 63 | 46 | 49 |

TABLE 10

| | | Comparative Example | | | |
|---|---|---|---|---|---|
| | | 9 | 10 | 11 | 12 |
| Silicone e | | 0.005 | 0.005 | 10 | 10 |
| Metal salt C-1 | | 0.1 | 0.1 | 0.1 | 0.1 |
| PTFE | | — | 0.3 | — | 0.3 |
| Flame retardance UL94 | 3.2 mm thick | V-1 (124) | V-1 (106) | V-0 (45) | V-0 (34) |
| | 1.6 mm thick | V-2 [5] | V-2 [2] | V-1 (57) | V-0 (45) |
| Moldability | | ○ | ○ | x | x |
| Notched inpact strength(Kgcm/cm) | | 61 | 43 | 60 | 60 |

TABLE 11

| | Comparative Example | | | | | | | | |
|---|---|---|---|---|---|---|---|---|---|
| | 13 | 14 | 15 | 16 | 17 | 18 | 19 | 20 | 21 |
| Silicone h | 2 | — | — | — | — | — | — | — | — |
| Silicone i | — | 2 | — | — | — | — | — | — | — |
| Silicone k | — | — | 2 | — | — | — | — | — | — |
| Silicone n | — | — | — | 2 | 2 | 2 | — | — | — |
| Silicone o | — | — | — | — | — | — | 2 | — | — |
| Silicone p | — | — | — | — | — | — | — | 2 | — |
| Silicone q | — | — | — | — | — | — | — | — | 2 |
| Metal salt C-1 | — | — | — | — | 0.1 | 0.1 | — | — | — |
| PTFE | — | — | — | — | — | 0.3 | — | — | — |

TABLE 11-continued

|  | Comparative Example | | | | | | | | |
|---|---|---|---|---|---|---|---|---|---|
|  | 13 | 14 | 15 | 16 | 17 | 18 | 19 | 20 | 21 |
| Flame retardance UL94 | | | | | | | | | |
| 3.2 mm thick | V-1 (79) | V-1 (80) | V-1 (92) | V-2 [4] | V-1 (124) | V-1 (111) | V-1 (95) | V-1 (78) | V-1 (87) |
| 1.6 mm thick | V-2 [2] | V-2 [2] | V-2 [3] | V-2 [5] | V-2 [5] | V-2 [3] | V-2 [3] | V-2 [2] | V-2 [3] |
| Moldability | ○ | ○ | ○ | X | X | X | ○ | ○ | Δ |
| Notched inpact strength (Kgcm/cm) | 62 | 61 | 60 | 47 | 46 | 47 | 64 | 63 | 61 |

TABLE 12

|  |  | Comparative Example | | | | |
|---|---|---|---|---|---|---|
|  |  | 22 | 23 | 24 | 25 | 26 |
| Silicone r |  | 2 | — | — | — | — |
| Silicone s |  | — | 2 | 2 | 2 | 2 |
| Metal salt C-1 |  | — | — | 0.1 | 0.1 | — |
| Metal salt C-3 |  | — | — | — | — | 0.1 |
| PTFE |  | — | — | — | 0.3 | 0.3 |
| Flame retardance UL94 | 3.2 mm thick | V-1 (116) | V-2 [4] | V-2 [4] | V-1 (136) | V-1 (131) |
|  | 1.6 mm thick | V-2 [4] | V-2 [5] | V-2 [5] | V-2 [3] | V-2 [3] |
| Moldability |  | Δ | x | x | x | x |
| Notched inpact strength(Kgcm/cm) |  | 55 | 47 | 46 | 46 | 45 |

TABLE 13

|  |  | Comparative Example | | | |
|---|---|---|---|---|---|
|  |  | 27 | 28 | 29 | 30 |
| Silicone d |  | 1 | 1 | 4 | 4 |
| Metal salt D |  | 0.005 | 6 | 0.005 | 6 |
| PTFE |  | 0.02 | 0.2 | — | — |
| Flame retardance UL94 | 3.2 mm thick | V-1 (94) | V-1 (106) | V-1 (90) | V-1 (140) |
|  | 1.6 mm thick | V-1 (130) | V-1 (132) | V-2 [2] | V-2 [2] |
| Moldability |  | ○ | Δ | ○ | Δ |
| Notched inpact strength(Kgcm/cm) |  | 63 | 44 | 58 | 45 |

As Examples 1 to 61 indicate, the polycarbonate resin compositions characterized by containing from 0.01 to 8 parts by weight of a silicone compound (B) whose backbone structure is branched and which contains aromatic groups and from 0.03 to 5 parts by weight of a metal salt of an aromatic sulfur compound (C) or from 0.01 to 5 parts by weight of a metal salt of a perfluoroalkanesulfonic acid (D) and the polycarbonate resin compositions containing, besides the above two compounds, from 0.05 to 5 parts by weight of a fiber-forming fluoropolymer (E) exhibited by far the greater flame-retarding effects than a polycarbonate resin alone that contained no such additive (Comparative Example 1), polycarbonate resin compositions that did not contain either a silicone compound (B) or a metal salt of an aromatic sulfur compound (C) (Comparative Examples 2 to 4, 13 to 15, & 19 to 22), and polycarbonate resin compositions that contained a silicone compound of a structure other than that according to the present invention (Comparative Examples 16 to 18 & 23 to 26). The examples of the invention also demonstrate marked improvements in the impact strength of polycarbonate resin compositions that has been a problem common to the conventional compositions containing a bromine type flame retardant.

With regard to the amount of a silicone compound (B) to be added, Examples 12 to 18 and Comparative Examples 9 to 12 reveal that when the amount is less than 0.01 part by weight the flame retardance drops (Comparative Examples 9 to 10) but when it is more than 8 parts by weight the moldability, in particular, is adversely affected (Comparative Examples 11 to 12).

As for the amount of a metal salt of an aromatic sulfur compound (C), Examples 4 to 11 and Comparative Examples 6 to 8 indicate that when the amount is below 0.03 part by weight the flame retardance is low (Comparative Example 6) and when it is above 5 parts by weight the moldability and impact strength decline (Comparative Examples 7 to 8).

Concerning a fiber-forming fluoropolymer (E) that is used in combination with a silicone compound (B) and a metal salt of an aromatic sulfur compound (C), Examples 22 to 28, 29 to 30, 33 to 34, 35 to 36, 37 to 38, 39 to 40, 41 to 42, and 43 to 44 show that the addition not only enhances the effect of preventing dripping of a burning polycarbonate resin composition but substantially shortens the combustion time. Thus the examples demonstrate that the fluoropolymer (E) not merely functions as an anti-dripping agent but achieves a unique synergistic effect of improving the flame retardance of a combined system of the silicone compound (B) and the metal salt (C) according to the invention. Incidentally, an attempt to form a composition by adding 6 parts by weight of the fluoropolymer (E) to the formulation of Example 22 failed because it could not be granulated for evaluation.

As for the amount of a metal salt of a perfluoroalkanesulfonic acid (D), Examples 54 to 57 and Comparative Examples 29 to 30 indicate that when the amount is below 0.01 part by weight the flame retardance is low (Comparative Example 29) and when it is above 5 parts by weight the flame retardance, moldability and impact strength decline (Comparative Example 30).

Concerning a fiber-forming fluoropolymer (E) that is used in combination with a silicone compound (B) and a metal salt of a perfluoroalkanesulfonic acid (D), Examples 55 and 58 show that the addition not only enhances the effect of preventing dripping of a burning polycarbonate resin composition but substantially shortens the combustion time. Thus the examples demonstrate that the fluoropolymer (E) not merely functions as an anti-dripping agent but achieves a unique synergistic effect of improving the flame retardance of a combined system of the silicone compound (B) and the metal salt (D) according to the invention. Incidentally, an attempt to form a composition by adding 6 parts by weight of the fluoropolymer (E) to the formulation of Example 55 failed because it could not be granulated for evaluation.

As regards the structure of the silicone compound, Examples 29 to 36 and Comparative Examples 16 to 18 indicate that when the backbone structure of the compound contains branching units, i.e., the unit of the formula $RSiO_{1.5}$ (unit T) and/or the unit of the formula $SiO_{2.0}$ (unit Q), it remarkably improves the flame retardance, moldability, and impact strength of the resulting polycarbonate resin compositions over the compositions using silicone not containing those units (Comparative Examples 16 to 18). Above all, the compositions in which the units account for more than 20 mol % of the total siloxane unit $(R_{3-0}SiO_{2-0.5})$ (Examples 29 to 34) show further improvements in those properties. It will also be obvious from a comparison between pairs of Examples 29, 30 and 33, 34, the silicone compounds containing more than 30 mol % branching units (Examples 29, 30) possess even better flame retardance and impact properties. However, when the proportion of the branching units exceeds 95 mol %, the resulting compositions are sometimes unable to achieve a marked flame-retarding effect. Thus it is desirable for the flame retardance, moldability, and impact strength that the branching units, i.e., the unit of the formula $RSiO_{1.5}$ (unit T) and/or the unit of the formula $SiO_{2.0}$ (unit Q), account for 20 mol % or more, preferably between 30 and 95 mol %, of the total siloxane unit $(R_{3-0}SiO_{2-0.5})$.

Further, as is evident from Examples 30, 31, the compounds having the unit of the formula $SiO_{2.0}$ (unit Q) alone as the branching unit exhibit flame retardance equivalent to or better than that of the compounds having only the unit of the formula $RSiO_{1.5}$ (unit T).

As Examples 37 to 42 and also as Examples 43 to 44 and Comparative Examples 23 to 26 show, the aromatic group (phenyl group) content in the organic groups of a silicone compound (B) improves the flame retardance, moldability, and impact strength of the polycarbonate resin compositions over those not containing the aromatic group (Comparative Examples 23 to 26). When the aromatic group content exceeds 20 mol % (Examples 37 to 42), further improvements are achieved in the flame retardance, moldability, and impact strength. As is manifest from Examples 37 to 40 and Examples 41 to 42, when it exceeds 40 mol % (Examples 37 to 40) the flame retardance is more markedly enhanced. When the aromatic group (phenyl group) content in the organic groups is more than 95 mol %, however, such remarkable flame-retarding effect sometimes can not be attained. Thus the aromatic group (phenyl group) content in the organic groups of a silicone compound (B) desirably is 20 mol % or upwards, and more desirably ranges from 40 to 95 mol %, because of its favorable effects upon the flame retardance, moldability, and impact strength.

As regards the end group of a silicone compound (B), Examples 13 and 17, 20 to 21, 30 to 32, and 37 to 38 indicate that the silicon compounds containing methyl group (Examples 13, 17, 30), phenyl group (Examples 37 to 38), hydroxyl group (Examples 20 to 21), and alkoxy group (methoxy group) (Example 32) exhibit good flame retardance, moldability, and impact strength. Even better flame retardance is attained when the end group is methyl rather than hydroxyl group as Examples 13 and 17, 20 and 21 demonstrate, or when it is methyl rather than alkoxy group as Examples 30 and 32 show. The same applies to methyl rather than phenyl group. The silicone compound that contains epoxy (γ-glycidoxypropyl) group or vinyl group is particularly reactive and the silicone compound reacts with itself to form a gel when it is mixed with a polycarbonate resin. Its gelation substantially affects the moldability of the polycarbonate resin, and the silicone compound (B) itself becomes less dispersible in the resin, rendering it unable to attain adequate flame-retarding effect and impact strength. For these reasons the end group of the silicone compound (B) is most preferably methyl group.

The molecular weight of the silicone compound (B) is between 5,000 and 500,000, preferably between 10,000 and 270,000, from the viewpoint of moldability and flame retardance, as will be obvious from Examples 2, 3, 17, and 19.

As for the structure of the metal salt of an aromatic sulfur compound (C), Examples 34 to 53 suggest that potassium salt of N-(p-tolylsulfonyl)-p-toluenesulfoimide (C-1), potassium salt of N-(N'-benzylaminocarbonyl)sulfanylimide (C-2"), or potassium diphenylsulfone-3-sulfonate (C-3) is suitably used and, potassium salt of N-(p-tolylsulfonyl)-p-toluenesulfoimide or potassium salt of N-(N'-benzylaminocarbonyl)sulfanylimide is more suitably used.

The results of the examples show that the combined use of from 0.01 to 8 parts by weight of a silicone compound (B) and from 0.03 to 5 parts by weight of a metal salt of an aromatic sulfur compound (C) or from 0.01 to 5 parts by weight of a metal salt of a perfluoroalkanesulfonic acid (D) according to the invention imparts by far the greater flame retardance to a polyearbonate resin (A) than by the silicone compound (B) alone. This is a unique synergistic effect observed only with the particular combination described above.

When from 0.05 to 5 parts by weight of a fiber-forming fluoropolymer (E) is further used together with the above combination, not only the anti-dripping effect on a burning polycarbonate resin composition is improved but also a very favorable effect is achieved on the shortening of the combustion time. Thus the addition brings a synergistic effect upon the improvement of overall flame retardance, uniquely to the combined system of the silicone compound (B) and the metal salt (C), or the silicone compound (B) and the metal salt (D).

The flame-retardant polycarbonate resin compositions according to the present invention attain great flame retardance while retaining good impact resistance and moldability unimpaired. Free from a flame retardant of chlorine, bromine compound or the like, they have no danger of evolving gases that contain any retardant-derived halogen during combustion. Because of the flame retardant in these compositions do not contain chlorine or bromine or the like, no halogen-containing gases are formed from the flame retardant when these compositions are burned, which is outstanding from the standpoint of environmental protection.

What is claimed is:

1. A flame-retardant polycarbonate resin composition comprising 100 parts by weight of a polycarbonate resin (A) and about 0.01 to about 8 parts by weight of a silicone compound (B), and also containing about 0.03 to about 5 parts by weight of a metal salt of an aromatic sulfur compound (C) or about 0.01. to about 5 parts by weight of a metal salt of a perfluoroalkanesulfonic acid (D), wherein the backbone structure of said silicone compound (B) is branched and said silicone compound (B) comprises organic groups that include aromatic groups, wherein said silicone compound (B) comprises a unit of a formula $RSiO_{1.5}$ (unit T) and/or a unit of a formula $SiO_{2.0}$ (unit Q) in a proportion of at least 20 mol % to the total of siloxane units $(R_{3-0}SiO_{2-0.5})$, in which R is an organic group, and the metal of the metal salt of said aromatic sulfur compound (C) is an alkali metal.

2. A flame-retardant polycarbonate resin composition according to claim 1 further comprising about 0.05 to about 5 parts by weight of a fiber-forming fluoropolymer (E).

3. The flame-retardant polycarbonate resin composition according to claim 1, wherein the amount of said silicone compound (B) is about 0.1 to about 5 parts by weight and the amount of said metal salt of an aromatic sulfur compound (C) is about 0.05 to about 2 parts by weight.

4. The flame-retardant polycarbonate resin composition according to claim 1, wherein the amount of said silicone compound (B) is about 0.1 to about 5 parts by weight and the amount of said metal salt of a perfluoroalkanesulfonic acid (D) is about 0.02 to about 2 parts by weight.

5. The flame-retardant polycarbonate resin composition according to claim 2, wherein the amount of said silicone compound (B) is about 0.1 to about 5 parts by weight, the amount of said metal salt of an aromatic sulfur compound (C) is about 0.05 to about 2 parts by weight and the amount of said fiber-forming fluoropolymer (E) is 0.05 to 1 part by weight.

6. The flame-retardant polycarbonate resin composition according to claim 1, wherein the proportion of said aromatic groups is at least 20 mol % to said organic groups.

7. The flame-retardant polycarbonate resin composition according to claim 2, wherein the proportion of said aromatic groups is at least 20 mol % to said organic groups.

8. The flame-retardant polycarbonate resin composition according to claim 1, said aromatic group is phenyl and the remainder of said organic groups is methyl, with end groups of said silicone compound (B) comprising at least one selected from the group consisting of methyl, phenyl, hydroxyl and alkoxy groups.

9. The flame-retardant polycarbonate resin composition according to claim 2, said aromatic group is phenyl and the remainder of said organic groups is methyl, with end groups of said silicone compound (B) comprising at least one selected from the group consisting of methyl, phenyl, hydroxyl and alkoxy groups.

10. The flame-retardant polycarbonate resin composition according to claim 1, wherein said metal salt of an aromatic sulfur compound (C) is a metal salt of an aromatic sulfonamide or a metal salt of an aromatic sulfonic acid and said metal salt of a perfluoroalkanesulfonic acid (D) contains 1 to 8 carbon atoms.

11. The flame-retardant polycarbonate resin composition according to claim 2, wherein said metal salt of an aromatic sulfur compound (C) is a metal salt of an aromatic sulfonamide or a metal salt of an aromatic sulfonic acid and said metal salt of a perfluoroalkanesulfonic acid (D) contains 1 to 8 carbon atoms.

12. The flame-retardant polycarbonate resin composition according to claim 10, wherein said metal salt of an aromatic sulfur compound (C) is a metal salt of at least one aromatic sulfonamide or aromatic sulfonic acid selected from the group consisting of saccharin, N-(-p-tolylsulfonyl)-p-toluenesulfonimide, N-(N'-benzyaminocarbonyl)sulfanylimide, N-(phenylcarboxyl)-sulfanylimide, diphenyl sulfone-3-sulfonic acid, diphenyl sulfone-3-3'-disulfonic acid and diphenylsulfone-3,4'-disulfonic acid.

13. The flame-retardant polycarbonate resin composition according to claim 11, wherein said metal salt of an aromatic sulfur compound (C) is a metal salt of at least one aromatic sulfonamide or aromatic sulfonic acid selected from the group consisting of saccharin, N-(-p-tolylsulfonyl)-p-toluenesulfonimide, N-(N-benzyaminocarbonyl)sulfanylimide, N-(phenylcarboxyl)-sulfanylimide, diphenyl sulfone-3-sulfonic acid, diphenyl sulfone-3-3'-disulfonic acid and diphenylsulfone-3,4-disulfonic acid.

14. The flame retardant polycarbonate resin according to claim 1 wherein the metal of the metal salt of said perfluoroalkanesulfonic acid (D) is an alkali metal.

15. The flame retardant polycarbonate resin according to claim 2 wherein the metal of the metal salt of said perfluoroalkanesulfonic acid (D) is an alkali metal.

16. The flame retardant polycarbonate resin according to claim 10 wherein the metal of the metal salt of said perfluoroalkanesulfonic acid (D) is an alkali metal.

17. The flame retardant polycarbonate resin according to claim 11 wherein the metal of the metal salt of said perfluoroalkanesulfonic acid (D) is an alkali metal.

18. The flame-retardant polycarbonate resin composition according to claim 2, wherein said fiber-forming fluoropolymer (E) is polytetrafluoroethylene.

19. The flame-retardant polycarbonate resin composition according to claim 5, wherein said fiberforming fluoropolymer (E) is polytetrafluoroethylene.

20. The flame-retardant polycarbonate resin composition according to claim 2, wherein the amount of said silicone compound (B) is about 0.1 to about 5 parts by weight, the amount of said metal salt of perfluoroalkanesulfonic acid (D) is about 0.02 to about 2 parts by weight, and the amount of said fiber forming fluoropolymer (E) is 0.05 to 1 part by weight.

21. The flame-retardant polycarbonate resin composition according to claim 20, wherein said fiber-forming fluoropolymer (E) is polytetrafluoroethylene.

22. The flame-retardant polycarbonate resin composition according to claim 1, wherein aromatic groups account for 10 to 90 mol % of the organic groups contained by silicone compound (B).

23. The flame-retardant polycarbonate resin composition according to claim 1, wherein aromatic groups account for at least 20 mol % of the organic groups contained by silicone compound (B).

24. The flame-retardant polycarbonate resin composition according to claim 23, wherein aromatic groups account for about 40 to about 95 mol % of the organic groups contained by silicone compound (B).

* * * * *